(12) United States Patent
Imada et al.

(10) Patent No.: US 7,568,755 B2
(45) Date of Patent: Aug. 4, 2009

(54) REAR FRAME STRUCTURE FOR VEHICLE

(75) Inventors: Shinichi Imada, Wako (JP); Manabu Abo, Wako (JP); Hidetoshi Kurata, Wako (JP); Norikazu Matsuura, Wako (JP); Yumi Saito, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/052,929

(22) Filed: Mar. 21, 2008

(65) Prior Publication Data

US 2009/0026802 A1    Jan. 29, 2009

(30) Foreign Application Priority Data

Mar. 23, 2007  (JP)  ............................. 2007-076647
Apr. 4, 2007   (JP)  ............................. 2007-098846

(51) Int. Cl.
   *B62D 25/08*    (2006.01)
(52) U.S. Cl. .............................. 296/187.11; 296/203.04
(58) Field of Classification Search ............ 296/187.03, 296/187.11, 183.08, 203.01, 203.04, 204
   See application file for complete search history.

(56) References Cited

U.S. PATENT DOCUMENTS 7,090,290 B2 *   8/2006   Neumeier et al. ........... 296/204

FOREIGN PATENT DOCUMENTS

JP        2005-119358        5/2005

* cited by examiner

*Primary Examiner*—Dennis H Pedder
*Assistant Examiner*—Pinel E Romain
(74) *Attorney, Agent, or Firm*—Rankin, Hill & Clark LLP

(57) ABSTRACT

A rear frame structure for a vehicle is disclosed, wherein an impact load can be satisfactorily absorbed in the case of a collision with a rear surface of the vehicle. The rear frame structure includes a pipe-shaped impact-absorbing member located between left and right rear frames. The impact-absorbing member has a center pipe that has a V shape in plan view, formed so as to protrude backward. The impact-absorbing member has left- and right-side pipes extending from the center pipe linearly upwardly to left and right end pipes. The impact load applied to the center pipe causes the left- and right-side pipes to undergo compressive deformation in their axial longitudinal directions as well as bending deformation towards the front of the vehicle body, whereby the impact load is absorbed.

3 Claims, 13 Drawing Sheets

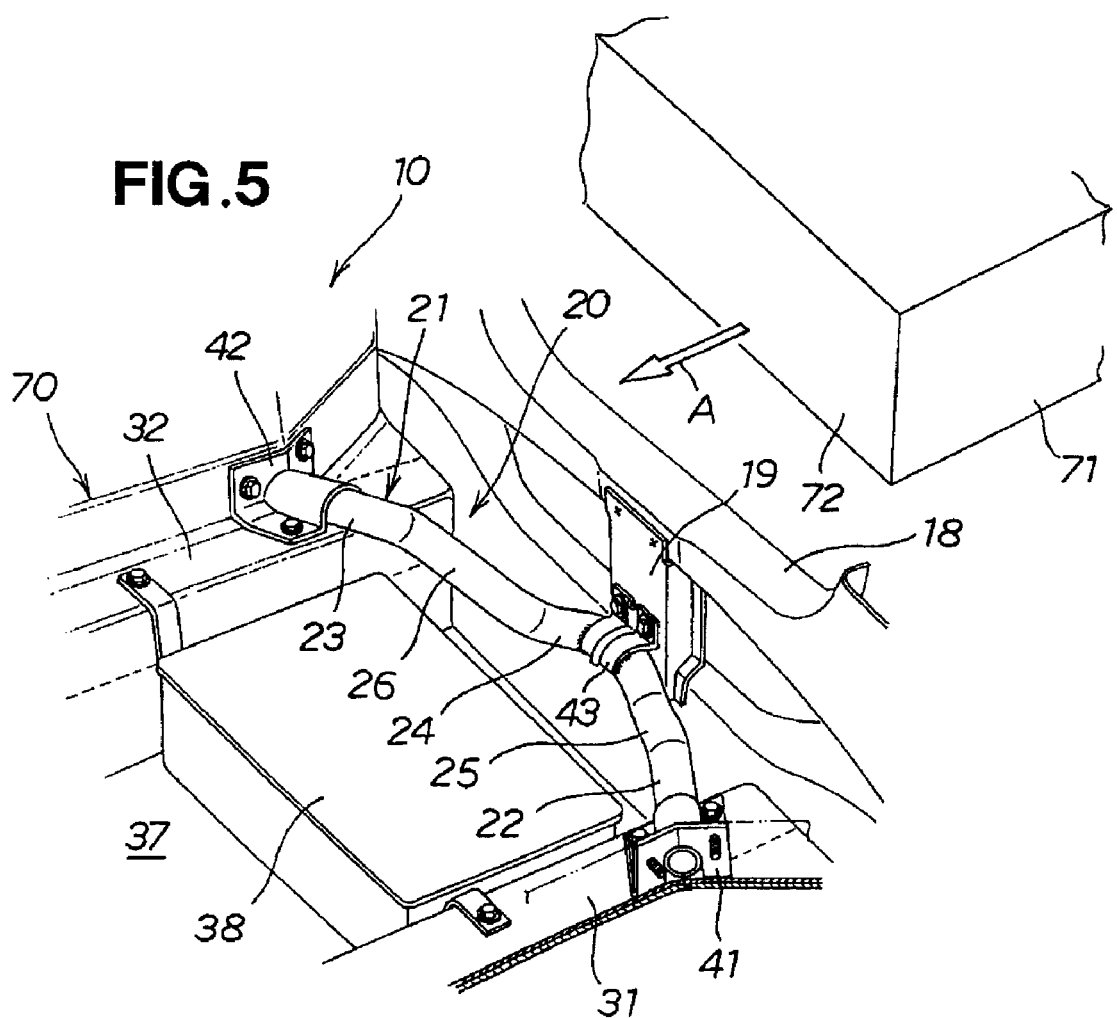

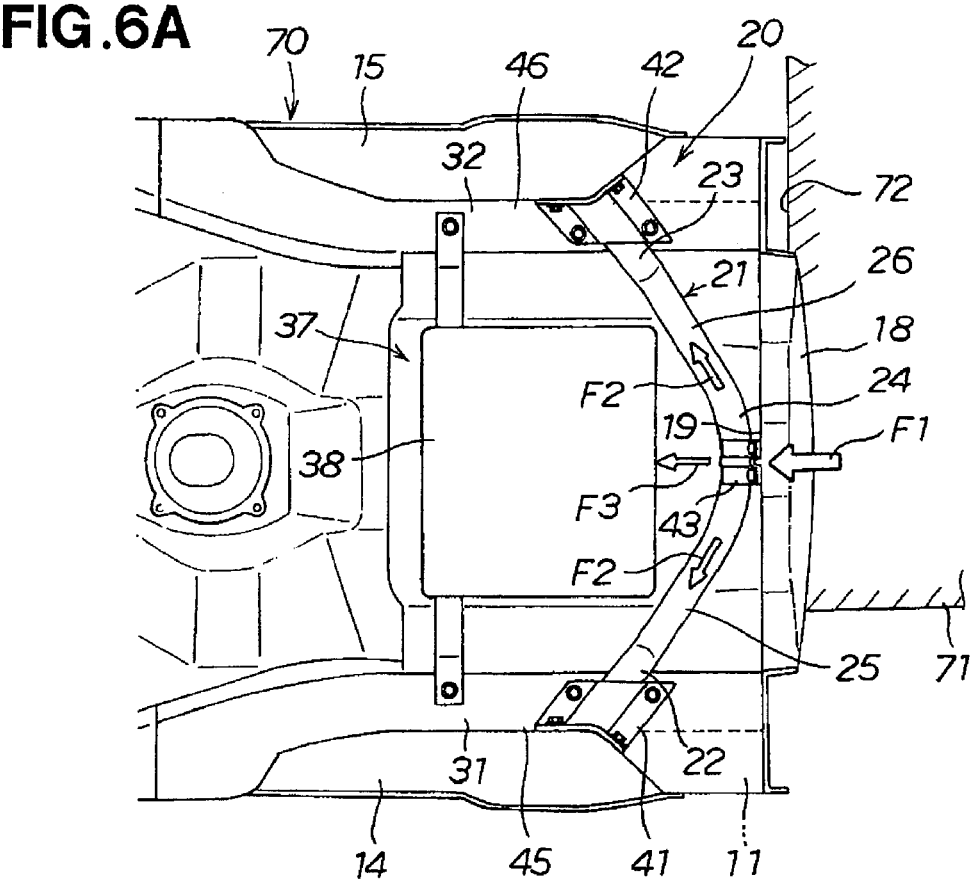
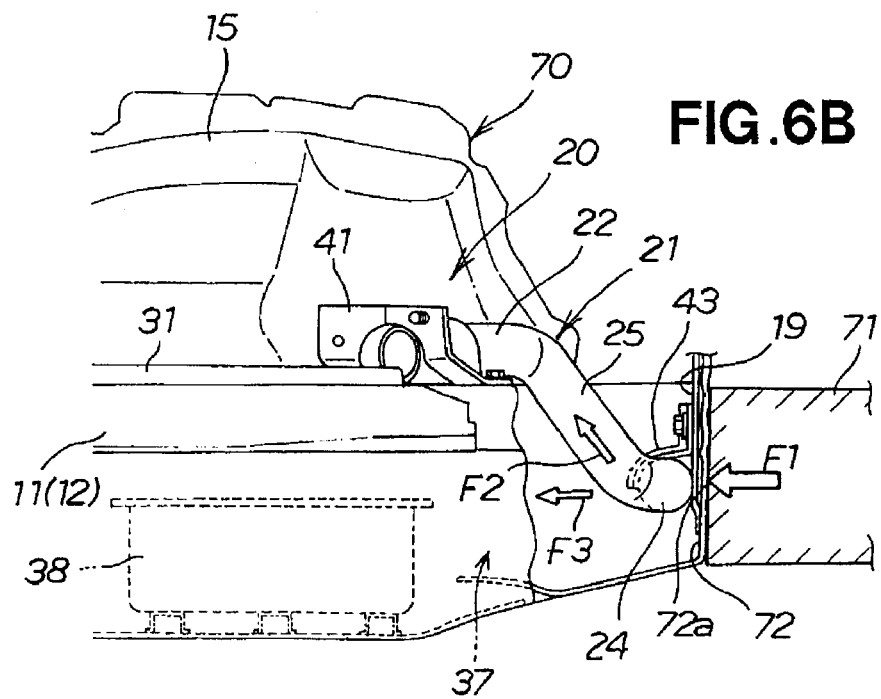

REAR FRAME STRUCTURE FOR VEHICLE

FIELD OF THE INVENTION

The present invention relates to a rear frame structure for a vehicle, which includes left and right rear frames provided with rear wheel houses, and rear end panels provided behind the left and right rear frames.

BACKGROUND OF THE INVENTION

In one known rear frame structure, a reinforcing member is provided to the rear frame of a vehicle, as is disclosed in JP 2005-119358 A. The reinforcing member is designed to cope with an impact load when an impact load (impact energy) acts on the rear part of a vehicle body in an offset collision when the vehicle is traveling at low speeds.

The rear frame structure in JP 2005-119358 A includes left and right rear frames extending along the longitudinal direction of the vehicle body, a cross member extending between the left and right rear frames, and a rear end panel spanning between the rear ends of the left and right rear frames.

Left and right diagonal members extend in a straight line from regions where the left and right rear frames are joined to the cross member towards the back of the vehicle body, and reach the widthwise center of the rear end panel. A guard block for dispersing and absorbing impact loads received by a bumper beam during rear impact at low speeds is disposed in the widthwise center of the rear end panel.

Thus, when an impact load acts on the rear of the vehicle body, the impact load is transferred by the left and right diagonal members to the left and right rear frames and the cross member, which disperse the load.

However, since the left and right diagonal members extend in a straight line, when an impact load acts on the rear of the vehicle body, it is difficult for the diagonal members to satisfactorily deform to absorb the impact load.

Furthermore, in another known example of a rear frame structure of a vehicle, the rigidity of rear side frames against rear impact is increased, as is disclosed in JP 2006-88886 A. In this rear frame structure, the rigidity of the rear side frames is increased by providing a gusset over the rear ends of the rear side frames, and by providing a partitioning wall to the cross section of the rear side frames, corresponding to the position where the gusset is placed.

In the rear frame structure in JP 2006-88886 A, when a load acts on the rear side frames from the rear of the vehicle body as a result of a rear collision, the gusset functions to prevent the rear side frames from buckling.

Within the rear ends of the rear side frames, the bottom parts begin to buckle. When this buckling causes the bottom parts to reach the partitioning wall, the front-to-back region of the partitioning wall moves upward. As a result, the orientation of the load acting on the bending parts of the rear side frames is changed to a direction parallel to that of the bending parts, and the rigidity of the rear side frames is increased.

Hybrid automobiles include a large battery for supplying a voltage to the motor. This large battery is usually installed in the rear of the vehicle body.

In view of this, when a load acts on the rear side frames from the rear of the vehicle body, it is preferable to further increase the rigidity of the rear frame structure of the vehicle in order to protect the large battery.

SUMMARY OF THE INVENTION

An object of the present invention is to provide a rear frame structure of a vehicle whereby an impact load can be satisfactorily absorbed.

Another object of the present invention is to provide a rear frame structure of a vehicle whereby a battery and other electrical components provided to the rear of the vehicle body can be protected.

According to an aspect of the present invention, there is provided a rear frame structure for a vehicle, which comprises: left and right rear frames disposed in transversely spaced relation to each other; left and right rear wheel houses disposed on the left and right rear frames and designed to house left and right rear wheels; a rear end panel disposed behind the left and right rear frames; and an impact-absorbing member disposed between the left and right rear frames and in front of the rear end panel, wherein the impact-absorbing member comprises a high-ductility metal reinforcing member which includes: a left end disposed at a left connecting part of the left rear frame and the left rear wheel house; a right end disposed at a right connecting part of the right rear frame and the right rear wheel house; a center part bent to protrude rearwardly of the vehicle and positioned lower than the left and right ends so as to be located at a position where an impact load is applied; a left-side part extending from the center part linearly upwardly to the left end; and a right-side part extending from the center part linearly upwardly to the right end, the impact-absorbing member being formed into a substantially V shape as viewed in top plan by the left- and right-side parts, the left and right ends, and the center part.

Thus, in the rear frame structure of the present invention, the impact-absorbing member is formed from a metal reinforcing member having excellent ductility. Therefore, bending the impact-absorbing member into a substantial V shape in plan view and disposing the center part at a lower position than the left and right ends causes the center part to be disposed at a position where an impact load is applied.

The left- and right-side parts extend in a straight line and at an upward gradient from the center part to the left and right ends, respectively, whereby an impact load is received by the center part, and part of the impact load acts as a compression load on the left- and right-side parts in their axial longitudinal directions. Therefore, the left- and right-side parts undergo compressive deformation in their axial longitudinal directions, thereby absorbing the compression load, which is part of the impact load.

Furthermore, the remnant of the impact load received by the center part causes the center part to move forward. The left- and right-side parts thereby both undergo bending deformation towards the front of the vehicle body, and the remaining impact load can be absorbed.

Thus, the left- and right-side parts are compressed under a compression load in their respective axial directions and also undergo bending deformation towards the front of the vehicle body, whereby the impact load is satisfactorily absorbed.

Preferably, the center part is attached to the rear end panel.

Desirably, the center part of the impact-absorbing member is attached to the vehicle body in order for the impact-absorbing member to be mounted on the vehicle body in a stable manner. It is also preferable that the center part be moved satisfactorily towards the front of the vehicle body in order for the impact-absorbing member to satisfactorily absorb the impact load. Therefore, the rear end panel is an area where an impact load is applied from behind the vehicle body, and the center part is provided to the rear end panel so as to satisfactorily deform towards the front of the vehicle body when an impact load is applied.

Thus, the rear end panel is the area where an impact load is applied from behind the vehicle body, and the rear end panel satisfactorily deforms towards the front of the vehicle body when an impact load is applied. Consequently, providing the center part to the rear end panel allows the center part to satisfactorily move together with the rear end panel towards the front of the vehicle body when an impact load is applied. As a result, the left- and right-side parts can both stably undergo bending deformation towards the front of the vehicle body, and the remaining impact load can be stably absorbed.

In a preferred form, the left and right ends are mounted respectively on the left and right connecting parts via left and right mounting brackets composed of high-tensile steel plates. Since the high-tensile steel plates are highly rigid, the left and right ends can thus be prevented from undergoing bending deformation by the mounting brackets when an impact load is applied.

According to another aspect of the present invention, there is provided a rear frame structure for a vehicle, which comprises: left and right rear frames disposed in transversely spaced relation to each other; a rear floor panel disposed between the left and right rear frames and having a storage concavity designed to carry a battery and other electrical components for a hybrid automobile; left and right extensions provided respectively on rear ends of the left and right rear frames; a bumper beam provided to extend between the left and right extensions; left and right gussets mounted below the bumper beam and respectively to rear end bottom parts of the left and right rear frames; and a cross member disposed to extend between the left and right gussets and to be positioned below the bumper beam and in front of the bumper beam.

In the present invention according to this other aspect, since the bumper beam spans the distance between the left and right rear frames via extensions, the bumper beam can be set apart at a specific interval from the left and right rear frames towards the rear of the vehicle body.

Having the cross member also span the distance between the left and right gussets allows the cross member to be disposed below the bumper beam and in front of the bumper beam. Consequently, when the rear surface of the vehicle body undergoes a minor collision, the minor load from the rear surface collision acts on the bumper beam. The applied minor load is transferred via the bumper beam to the left and right extensions. The bumper beam deforms and the extensions collapse (buckle) in their axial directions, whereby part of the minor load is absorbed.

The remaining load is transferred to the left and right rear frames and is supported by the left and right rear frames. Thereby, in cases in which a minor load acts on the rear surface of the vehicle body, the battery and other electrical components placed in the rear part of the vehicle body are reliably protected by the bumper beam and the left and right extensions.

When the rear surface of the vehicle body undergoes a major collision, the major load from the rear surface collision first acts on the bumper beam. The bumper beam deforms by the applied major load and the left and right extensions collapse (buckle) in their axial directions, whereby the bumper beam moves forward up to the cross member. The applied major load is applied to both the bumper beam and the cross member. The load applied to the cross member causes the cross member to deform and the left and right gussets to deform as well. Consequently, part of the major load is absorbed as a result of the deformation of the bumper beam, the collapse of the left and right extensions, the deformation of the cross member, and the deformation of the left and right gussets.

The remaining load is transferred to the left and right rear frames and is supported by the left and right rear frames. Thereby, when a major load is applied to the rear surface of the vehicle body, a battery and other electrical components placed in the rear part of the vehicle body are reliably protected by the bumper beam, the left and right extensions, the cross member, and the left and right gussets.

Additionally, providing the cross member below the bumper beam makes it possible to increase the vertical dimension of the pressure-receiving surface (the surface that bears the load) in relation to rear collisions. Thereby, the load from a collision can be sufficiently absorbed by the cross member, the bumper beam, and other components, even in cases in which the automobile is struck from behind by a vehicle of a different height.

The rear frame structure of the present invention according to another aspect preferably further comprises a reinforcing member spanning the distance between the left and right rear frames positioned in front of the cross member; and a center part of the reinforcing member formed into a curved shape so as to protrude towards the cross member. Therefore, when a local load acts on the center part of the cross member and the cross member deforms, the cross member is supported by the reinforcing member, and a battery and other electrical components placed in the rear part of the vehicle body are more reliably protected.

BRIEF DESCRIPTION OF THE DRAWINGS

Certain preferred embodiments of the present invention will be described in detail below, by way of example only, with reference to the accompanying drawings, in which:

FIG. 5 is a perspective view showing an example in which a vehicle provided with the rear frame structure according to the first embodiment undergoes an offset collision at the rear;

FIGS. 6A through 6D are views showing states in which an impact load is absorbed by impact-absorbing members when a vehicle provided with the rear frame structure according to the first embodiment undergoes an offset collision at the rear;

DETAILED DESCRIPTION OF THE PREFERRED EMBODIMENTS

Figure 1:
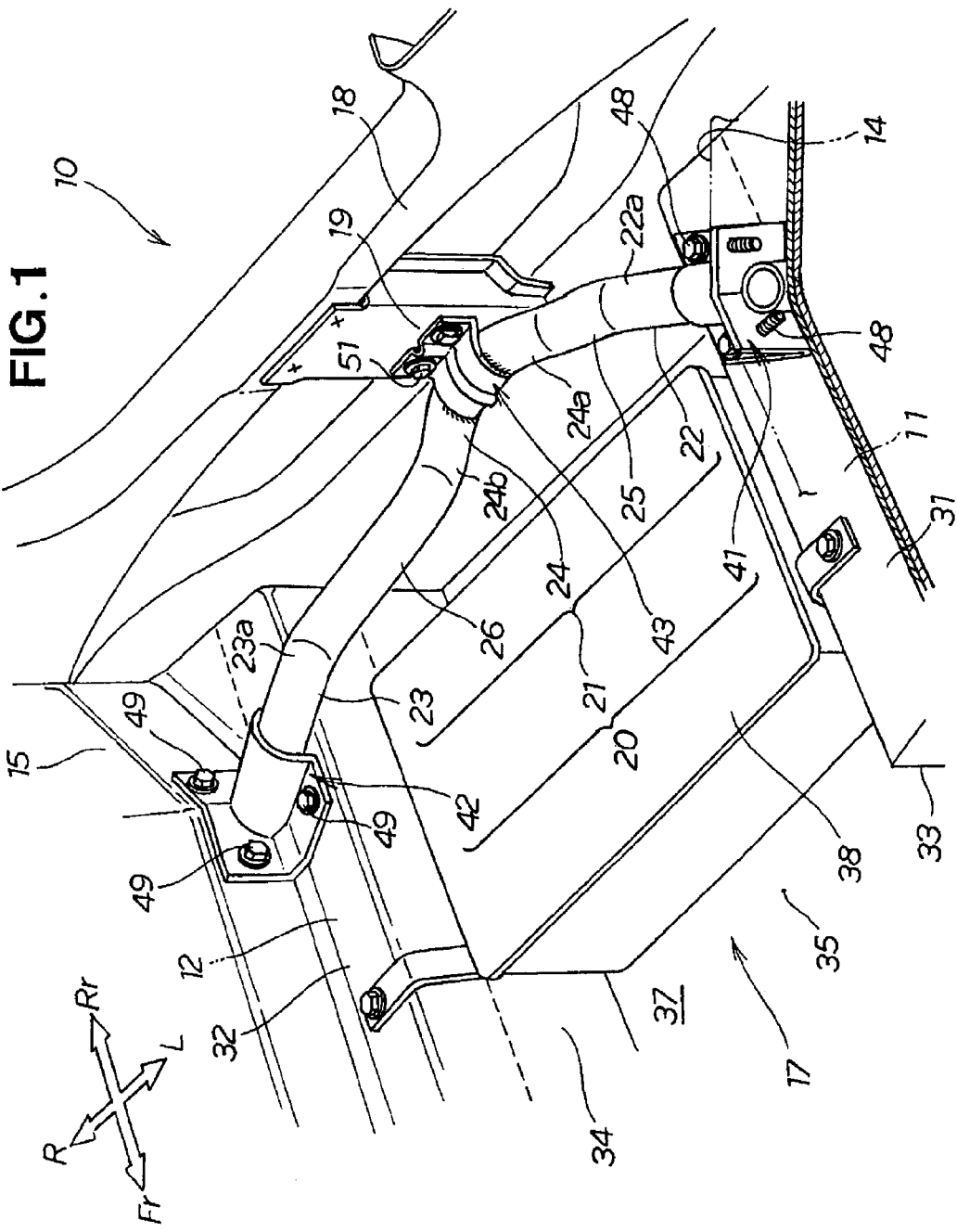
FIG. 1 is a perspective view showing a rear frame structure according to a first embodiment of the present invention.

In the descriptions of the embodiments of the present invention, the letters Fr, Rr, L, and R in the drawings refer to the directions "front," "rear," "left," and "right" of the vehicle from the driver's perspective. In the present embodiment, an example is described in which the rear frame structure is applied to a hybrid automobile, but the present invention is not limited to this example and can also be applied to gasoline vehicles and diesel vehicles.

First, a rear frame structure 10 of the first embodiment will be described with reference to FIGS. 1 through 6D.

Referring to FIG. 1, the rear frame structure 10 for a vehicle of the first embodiment includes left and right rear frames 11, 12 disposed along the longitudinal direction of the vehicle body, left and right rear wheel houses 14, 15 provided to the left and right rear frames 11, 12, a rear floor 17 provided between the left and right rear frames 11, 12, a rear end panel 18 provided at the rear end of the left and right rear frames 11, 12 and the rear end of the rear floor 17, and impact-absorbing means 20 provided between the left and right rear frames 11, 12, in front of the rear end panel 18 with respect to the vehicle body.

The left rear wheel house 14 houses a left rear wheel and a left rear damper (not shown). The right rear wheel house 15 houses a right rear wheel and a right rear damper (not shown).

A left mounting side part 31 is disposed on the top of the left rear frame 11 and is provided on the wall surface of the left rear wheel house 14 (see FIG. 6A). A right mounting side part 32 is disposed on the top of the right rear frame 12 and is provided on the wall surface of the right rear wheel house 15 (see FIG. 6A).

The rear floor 17 has a left wall 33 (see FIG. 4) extending down from the inside of the left mounting side part 31, a right wall 34 extending down from the inside of the right mounting side part 32, and a bottom part 35 provided to the bottom of the left wall 33 and the bottom of the right wall 34.

A battery storage space 37 for storing a battery 38 is formed by the left and right walls 33, 34 and the bottom part 35. The battery 38 is of a large size and supplies electric power to a motor (not shown) for the hybrid vehicle.

Figure 3:
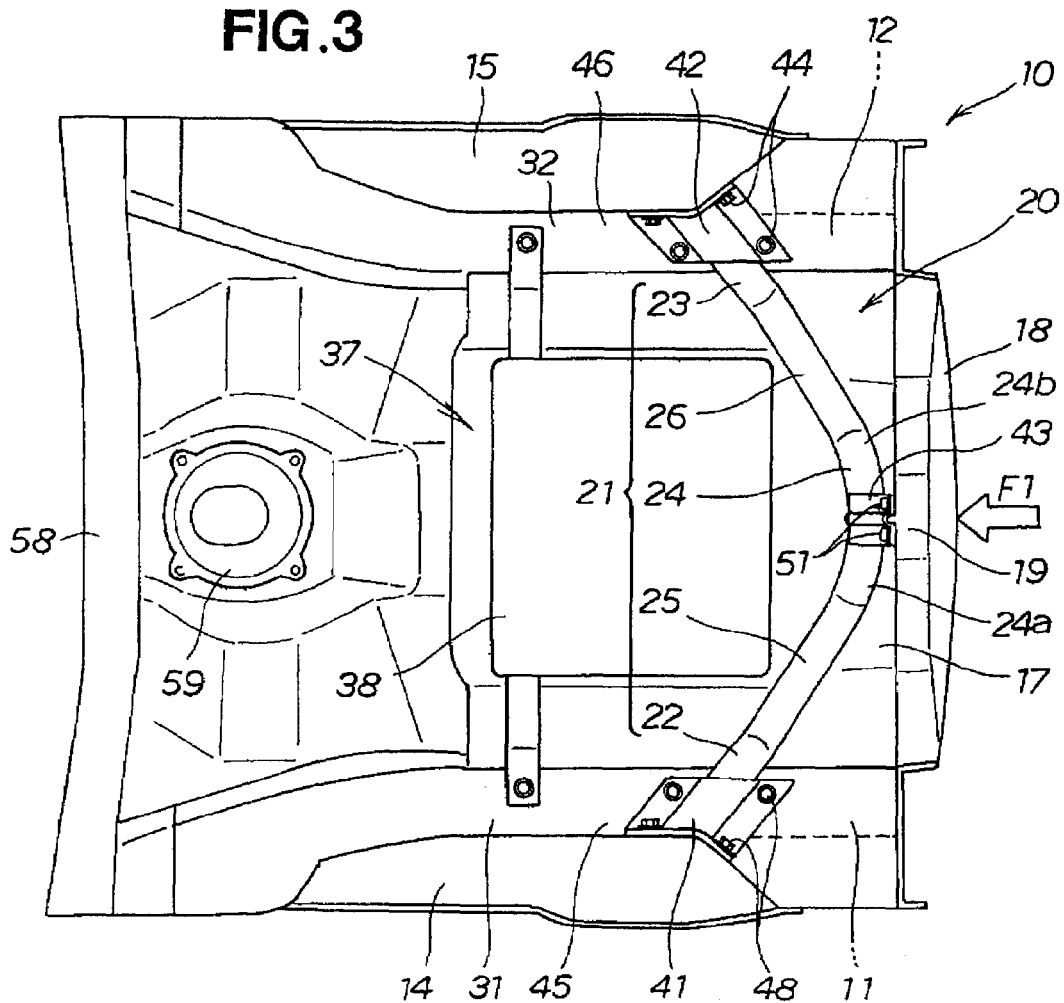
FIG. 3 is a plan view of the rear frame structure of FIG. 1.

The rear end panel 18 is provided, as shown in FIG. 3, to the rear ends of the left and right rear frames 11, 12 and the rear end of the rear floor 17 (see FIG. 3), and bears an impact load F1 from the behind the vehicle body.

The impact-absorbing means 20 is provided in front of the rear end panel 18, and includes an impact-absorbing member 21 for absorbing the impact load F1 (FIG. 3) acting on the rear end panel 18, a left mounting bracket 41 for attaching a left end pipe (left end part) 22 of the impact-absorbing member 21, a right mounting bracket 42 for attaching a right end pipe (right end part) 23 of the impact-absorbing member 21, and a center bracket 43 for attaching a center pipe (center part) 24 of the impact-absorbing member 21.

The elements of the impact-absorbing means 20 are described in detail hereinbelow with reference to FIGS. 2 through 4.

Figure 2:
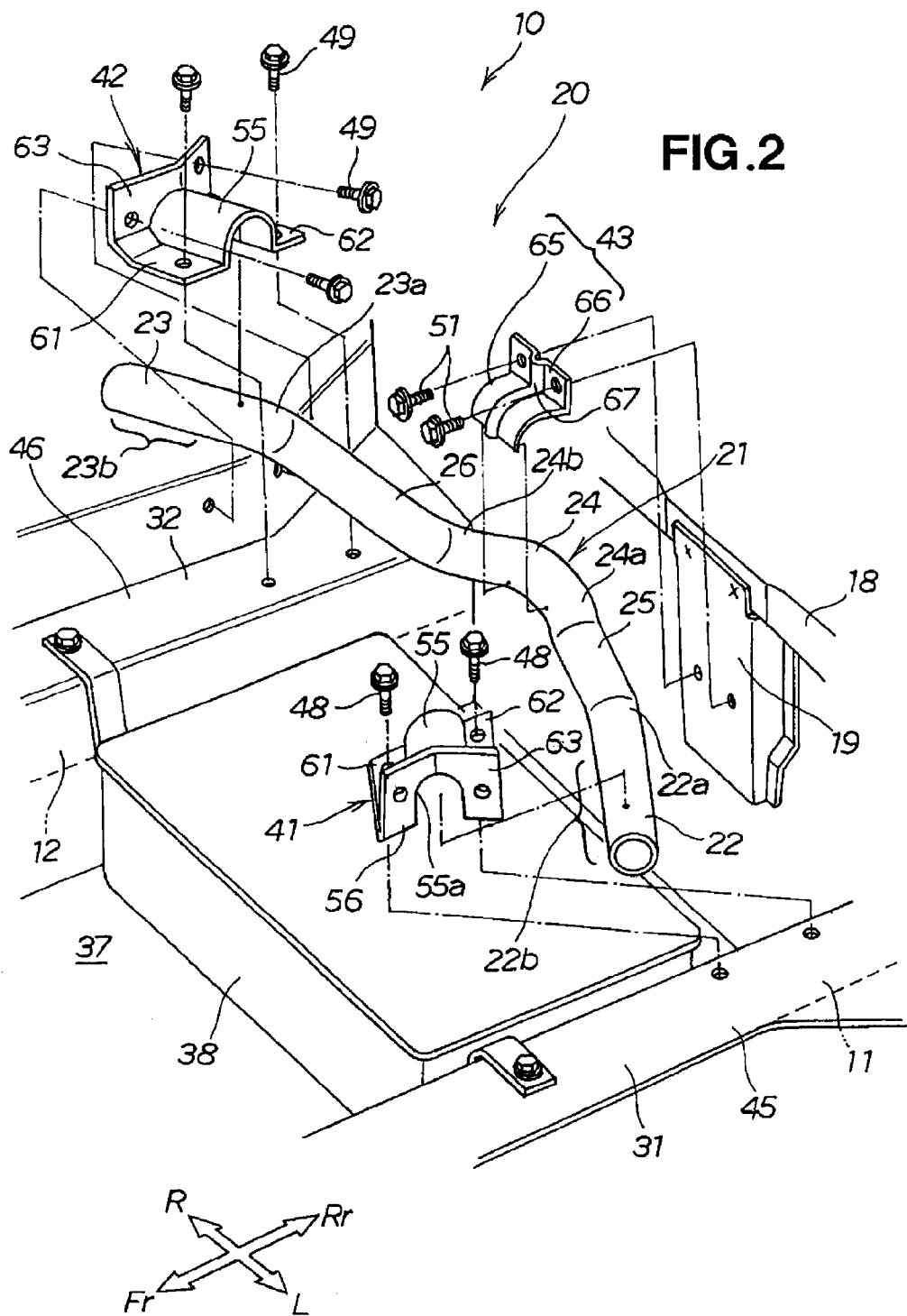
FIG. 2 is a perspective view showing an exploded view of the rear frame structure of FIG. 1.

Referring to FIGS. 2 and 3, the impact-absorbing member 21 is a metal reinforcing member that has excellent ductility and can plastically deform. The impact-absorbing member 21 is formed into a substantial V shape protruding towards the rear of the vehicle body in a plan view, as shown in FIG. 3.

One possible example of a metal reinforcing member is an iron pipe formed into a closed cross section, but the present invention is not limited to an iron member, and other metal reinforcing members having excellent ductility can also be used.

The reinforcing member is not limited to a round cylindrical member, and a cylindrical member having a rectangular shape or a polygonal shape in cross section may also be used.

The pipe formation of the reinforcing member is not limited to bending, and hydroforming can also be used. The reinforcing member can also be formed by pressing and welding a steel plate. Another possible example for the reinforcing member is a press member that has been formed by press forming into an initial cross section (open cross section) having a substantial C or U shape or the like.

The primary role of the impact-absorbing member 21 is to absorb the impact load and protect the large battery 38 placed in front of the impact-absorbing member 21 when an impact load F1 acts on the rear of the vehicle body during a low-speed offset collision.

The impact-absorbing member 21 is composed of the left end pipe 22 positioned at a left connecting part 45, the right end pipe 23 positioned at a right connecting part 46, the center pipe 24 disposed at a position at which the impact load F1 (see FIG. 3) acts, a left-side pipe (left-side part) 25 extending in a straight line and in an upward gradient from the center pipe 24 to the left end pipe 22, and a right-side pipe (right-side part) 26 extending in a straight line and in an upward gradient from the center pipe 24 to the right end pipe 23.

The left connecting part 45 is the area where the left rear frame 11 and the left rear wheel house 14 are connected.

The left end pipe 22 is welded to the left mounting bracket 41. The left mounting bracket 41 is mounted to the left rear frame 11 and the left rear wheel house 14 by four bolts 48. This left end pipe 22 is disposed horizontally along the left mounting side part 31, and is mounted to the left connecting part 45 via the left mounting bracket 41.

The right connecting part 46 is the area where the right rear frame 12 and the right rear wheel house 15 are connected.

The right end pipe 23 is welded to the right mounting bracket 42. The right mounting bracket 42 is mounted to the right rear frame 12 and the right rear wheel house 15 by four bolts 49. The right end pipe 23 is disposed horizontally along the right mounting side part 32, and is mounted to the right connecting part 46 via the right mounting bracket 42.

The center pipe 24 protrudes toward the rear of the vehicle body and is bent into a curved shape. The center pipe 24 is displaced downward from the left and right end pipes 22, 23 by a distance H (see FIG. 4), and is thereby provided to a position (in terms of height) at which the impact load F1 acts. Specifically, the center pipe 24 is provided to a position where the impact load F1 is applied to the rear end panel 18 from a colliding surface 72 of a trailing vehicle 71 when the colliding surface 72 collides with the rear end panel 18 as shown in FIG. 6B The position at which the impact load F1 acts is determined by legal requirements.

The center pipe 24 is welded to the center mounting bracket 43. The center mounting bracket 43 is mounted by bolts 51, 51 to a widthwise center area 19 on the rear end panel 18.

The left-side pipe 25 extends in a straight line and in an upward gradient from a left end 24a of the center pipe 24 to an inside end 22a of the left end pipe 22.

The right-side pipe 26 extends in a straight line and in an upward gradient from a right end 24b of the center pipe 24 to an inside end 23a of the right end pipe 23.

The impact-absorbing member 21 is formed into a substantial V shape in a plan view by the left and right end pipes 22, 23, the left- and right-side pipes 25, 26, and the center pipe 24, as shown in FIG. 3.

The left mounting bracket 41 shown in FIG. 2 is formed from a highly rigid, high-tensile steel plate. Specifically, the left mounting bracket 41 may be made of, e.g., aluminum, stainless steel, or another such metal material, and it is particularly preferable to use a bracket formed from a highly rigid, high-tensile steel plate.

The left mounting bracket 41 has an insertion part 55 into which is inserted a distal end 22b of the left end pipe 22 of the impact-absorbing member 21, and a mounting part 56 formed integrally with the insertion part 55. The insertion part 55 is formed into a reverse U shape in cross section so that the cylindrical shape of the distal end 22b can be inserted, and an inner wall 55a thereof has a concave shape.

In a state in which the distal end 22b of the left end pipe 22 is inserted into the insertion part 55, the inner wall 55a is placed along the distal end 22b. The insertion part 55 is integrally attached to the distal end 22b by welding.

The mounting part 56 is composed of a front projection 61 that projects toward the front of the vehicle body from the front of the insertion part 55, a rear projection 62 that projects toward the rear of the vehicle body from the rear of the insertion part 55, and a top projection 63 that projects upward from the outer end of the insertion part 55.

A bolt is inserted through a mounting hole in the front projection 61, and the inserted bolt 48 is threaded into the left mounting side part 31.

A bolt 48 is inserted through a mounting hole in the rear projection 62, and the inserted bolt 48 is threaded into the left mounting side part 31.

Bolts 48, 48 are inserted through mounting holes in the top projection 63, and the inserted bolts 48, 48 are threaded into the left rear wheel house 14.

Thus, the left mounting bracket 41 is mounted on the left connecting part 45, and the distal end 22b of the left end pipe 22 is mounted to the left connecting part 45. Specifically, the left end pipe 22 is disposed horizontally along the left mounting side part 31, and is also disposed in a tapered shape so as to extend towards the rear and widthwise center of the vehicle body as shown in FIG. 3.

The right mounting bracket 42 is bilaterally symmetrical to the left mounting bracket 41. The structural components of the right mounting bracket 42 are denoted by the same numerical symbols as with the left mounting bracket 41.

A bolt 49 is inserted through a mounting hole in the front projection 61, and the inserted bolt 49 is threaded into the right mounting side part 32.

A bolt 49 is inserted through a mounting hole in the rear projection 62, and the inserted bolt 49 is threaded into the right mounting side part 32.

Bolts 49, 49 are inserted through mounting holes in the top projection 63, and the inserted bolts 49, 49 are threaded into the right rear wheel house 15.

Thus, the right mounting bracket 42 is mounted on the right connecting part 46, and the distal end 23b of the right end pipe 23 is mounted on the right connecting part 46. Specifically, the right end pipe 23 is disposed horizontally along the right mounting side part 32, and is also disposed in a tapered shape so as to extend towards the rear and widthwise center of the vehicle body as shown in FIG. 3.

Figure 6C:
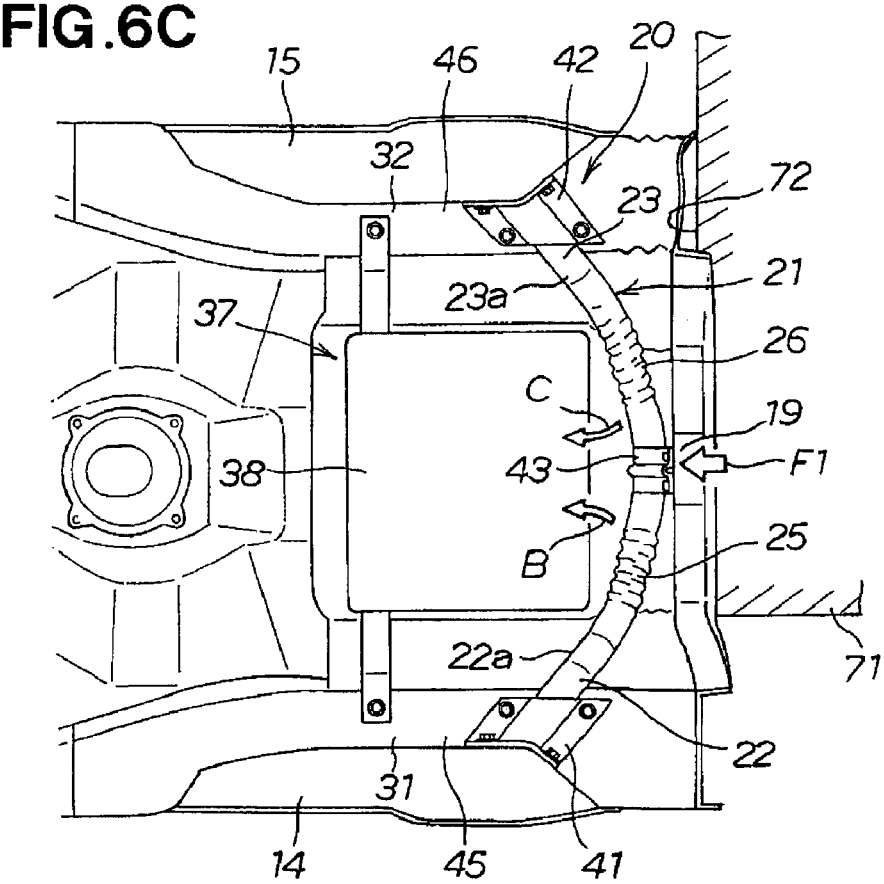
Figure 6D:
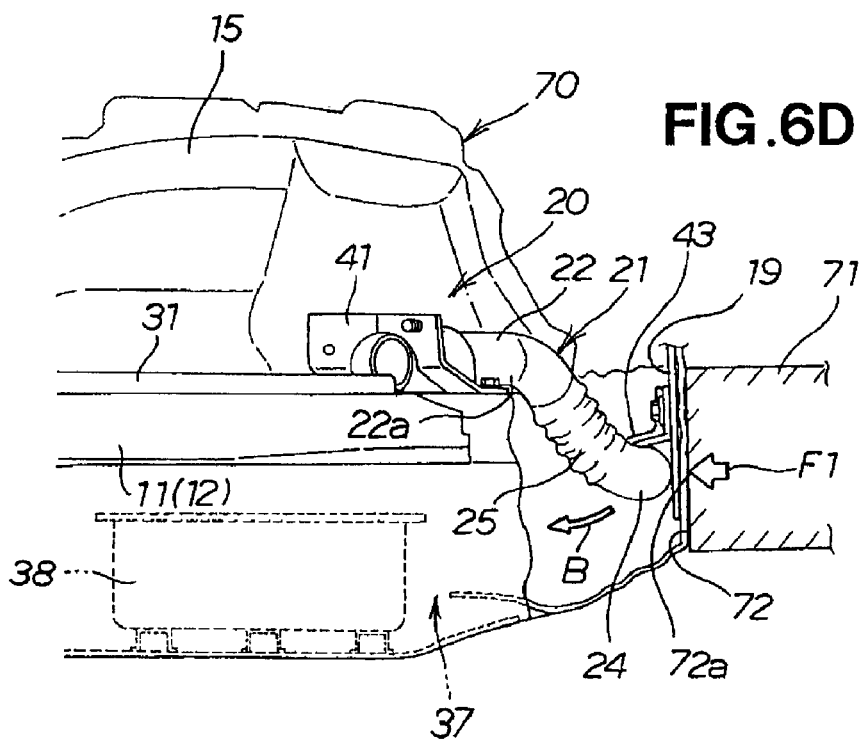

The reasons for forming the left and right mounting brackets 41, 42 from highly rigid, high-tensile steel plates are described in detail in FIGS. 6C and 6D.

The center bracket 43 has a center insertion part 65 into which is inserted the center pipe 24 of the impact-absorbing member 21, and a center mounting part 66 formed integrally with the center insertion part 65.

The center bracket 43 has a reinforcing rib 67 formed between the center insertion part 65 and the center mounting part 66.

The center insertion part 65 is formed into an arcuate shape so that the cylindrical upper half of the center pipe 24 can be inserted.

The center insertion part 65 is integrally attached to the center pipe 24 by welding in a state in which the center pipe 24 has been inserted through the center insertion part 65.

The bolts 51, 51 are inserted through mounting holes in the center mounting part 66, and are threaded into the widthwise center area 19 of the rear end panel 18. As a result, the center bracket 43 is mounted on the widthwise center area 19 of the rear end panel 18, and the center pipe 24 is mounted substantially horizontally on the widthwise center area 19.

The center pipe 24 is mounted on the widthwise center area 19 of the rear end panel 18 in a state in which the center pipe is substantially horizontal while protruding toward the rear of the vehicle body in a plan view. Therefore, the impact-absorbing member 21 is mounted on the vehicle body in a stable manner.

The reasons for mounting the center pipe 24 on the widthwise center area 19 of the rear end panel 18 are described in detail in FIGS. 6C and 6D.

A cross member 58 is mounted between the left and right rear frames 11, 12 at a position in front of the battery storage space 37, as shown in FIG. 3.

A cover 59 for maintenance purposes is detachably provided behind the cross member 58. A fuel tank (not shown) is placed below the cover 59.

Figure 4:
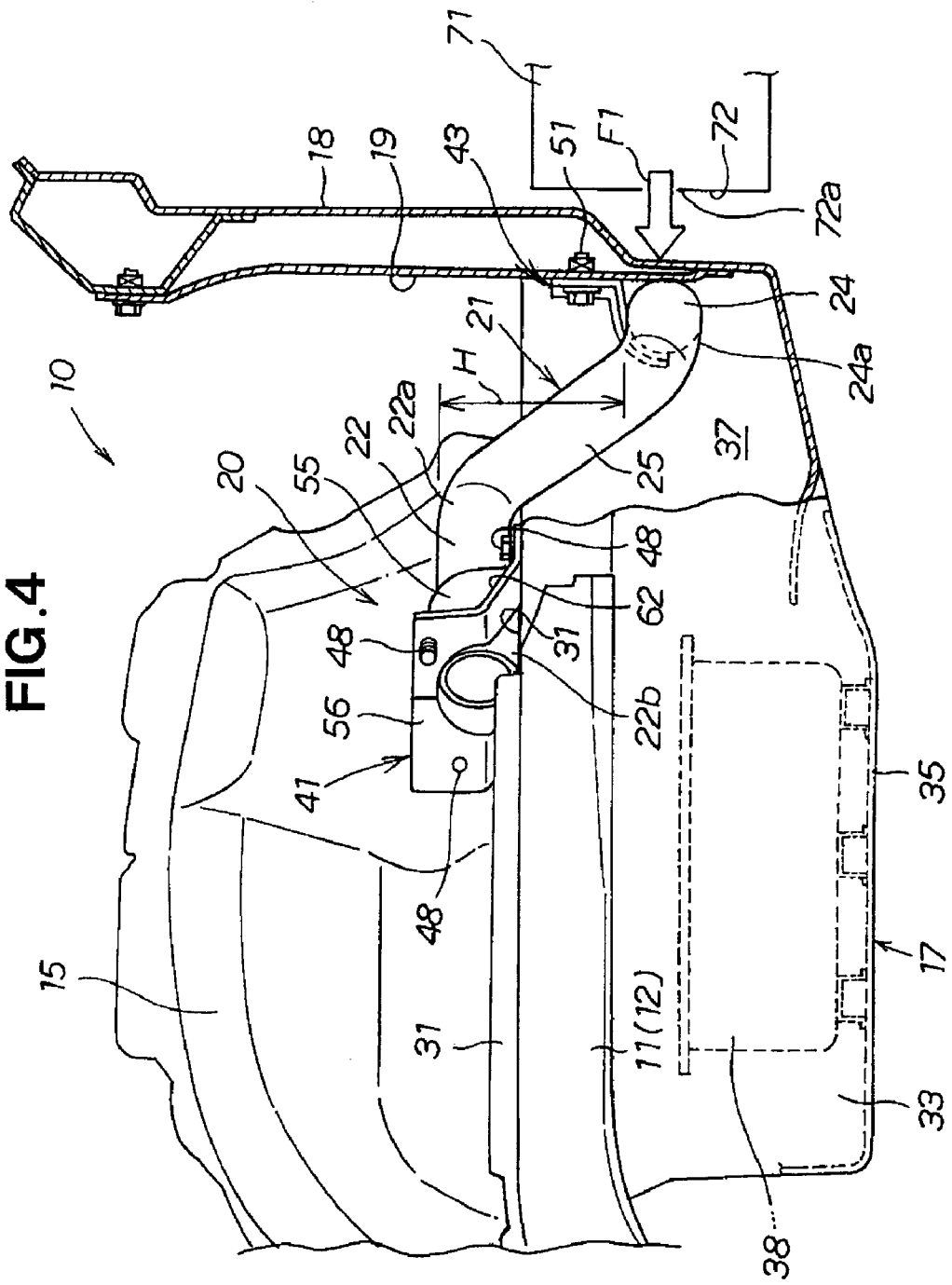
FIG. 4 is a side view showing in cross section part of the rear frame structure of FIG. 3.

The left end pipe 22 of the impact-absorbing member 21 is mounted at the top of the left rear frame 11 (specifically, on the left mounting side part 31) by the left mounting bracket 41, as shown in FIG. 4.

The right end pipe 23 of the impact-absorbing member 21 is mounted at the top of the right rear frame 12 (specifically, on the right mounting side part 32) via the right mounting bracket 42, as shown in FIG. 3.

Specifically, the left and right end pipes 22, 23 are mounted above the battery storage space 37.

Referring to FIG. 4 again, the center pipe 24 is disposed substantially in the vertical center in the rear part of the battery storage space 37.

The center pipe 24 is provided to a position at which the impact load F1 acts when the trailing vehicle 71 collides with the rear part of the vehicle body (the rear end panel 18). In other words, the center pipe 24 is provided at a position corresponding to the vertical center 72a of the colliding surface 72 of the trailing vehicle 71.

The left-side pipe 25 of the impact-absorbing member 21 extends in a straight line and in an upward gradient from the left end 24a of the center pipe 24 to the inside end 22a of the left end pipe 22.

The right-side pipe 26 of the impact-absorbing member 21 extends in a straight line and in an upward gradient from the right end 24b of the center pipe 24 to the inside end 23a of the right end pipe 23, as shown in FIG. 1.

Thus, in a state in which the left and right end pipes 22, 23 are disposed above the battery storage space 37 due to the left-side pipe 25 and right-side pipe 26 extending at an upward gradient, the center pipe 24 can be disposed within the battery storage space 37 at a position at which the impact load F1 acts. As a result, the left and right end pipes 22, 23 are positioned above the battery storage space 37, and a large battery storage space 37 can be ensured.

The left end pipe 22 of the impact-absorbing member 21 is mounted on the top of the left rear frame 11 (specifically, on the left connecting part 45), and the right end pipe 23 of the impact-absorbing member 21 is mounted on the top of the right rear frame 12 (specifically, on the right connecting part 46).

The left connecting part 45 is the area where the left rear frame 11 and the left rear wheel house 14 are connected, and undergoes little deformation from impact.

The right connecting part 46 is the area where the right rear frame 12 and the right rear wheel house 15 are connected, and undergoes little deformation from impact.

Thus, the left and right end pipes 22, 23 of the impact-absorbing member 21 are both mounted in areas that undergo little deformation from impact, thereby improving the efficiency of absorbing impact loads through the impact-absorbing member 21.

Next, the operation of the rear frame structure 10 will be described with reference to FIGS. 5 through 6D.

FIG. 5 shows an example of an offset collision between the trailing vehicle 71 and a vehicle provided with the rear frame structure 10. The reference numeral 70 denotes the vehicle provided with the rear frame structure 10 of the present embodiment.

The trailing vehicle 71 collides with the rear part of the vehicle 70 in an offset collision at a low speed, as shown by the arrow A. Specifically, the trailing vehicle 71 collides with the vehicle 70 at a low speed at a position offset to the right side.

FIGS. 6A and 6B show the instant in which the trailing vehicle 71 collides with the vehicle 70 of the present embodiment in an offset collision.

The colliding surface 72 of the trailing vehicle 71 collides at a low speed in an offset state with the rear end panel 18 of the vehicle 70, whereby the colliding surface 72 does not collide with the rear end part of the left rear frame 11, as shown in FIG. 6A.

As described above, the center pipe 24 of the impact-absorbing member 21 is bent into a substantial V shape in a plan view so as to protrude toward the rear of the vehicle body. The center pipe 24 is mounted on the widthwise center area 19 of the rear end panel 18 by the center bracket 43. Therefore, when the colliding surface 72 of the trailing vehicle 71 collides at a low speed with the rear end panel 18 in an offset state, the impact load F1 acts on the center pipe 24 of the impact-absorbing member 21.

Since the center pipe 24 of the impact-absorbing member 21 is positioned lower than the left and right end pipes 22, 23, the center pipe 24 is positioned at a height subject to the impact load F1, as shown in FIG. 6B.

The left-side pipe 25 extends in a straight line and in an upward gradient from the center pipe 24 to the left end pipe 22. The right-side pipe 26 extends in a straight line and in an upward gradient from the center pipe 24 to the right end pipe 23. Additionally, the impact-absorbing member 21 is formed from a metal reinforcing member having excellent ductility.

Consequently, the center pipe 24 bears the impact load F1. Part of the impact load F1 is dispersed as shown by the arrows as compression loads F2, F2 in the axial directions of the left- and right-side pipes 25, 26, as shown in FIG. 6A.

An impact load F3, which is the remnant of the impact load F1 received by the center pipe 24, causes the center pipe 24 to move forward as shown by the arrow.

FIGS. 6C and 6D show a state in which an impact load is absorbed by the impact-absorbing member 21.

When the compression loads F2 act in the axial directions of the left- and right-side pipes 25, 26 as shown in FIG. 6A, compressive deformation occurs in the left- and right-side pipes 25, 26 in the axial directions as shown in FIG. 6C.

When compressive deformation occurs in the left- and right-side pipes 25, 26 in the axial directions, the compression loads F2 (FIG. 6A) are absorbed.

As described above, the remaining impact load F3 causes the center pipe 24 to move forward. When the center pipe 24 moves forward, the left-side pipe 25 undergoes bending deformation (see also FIG. 6D) forward as shown by the arrow B, which the inside end 22a of the left end pipe 22 as a fulcrum.

At the same time, the right-side pipe 26 also bends and deforms forward as shown by the arrow C, with the inside end 23a of the right end pipe 23 as a fulcrum.

Thus, the left- and right-side pipes 25, 26 bend and deform forward, whereby the remaining impact load F3 (see FIG. 6) is absorbed.

The rear end panel 18 is the area subjected to the impact load F1 from behind the vehicle body. This rear end panel 18 satisfactorily deforms toward the front of the vehicle body when subjected to the impact load F1.

Consequently, the result of providing the center pipe 24 to the rear end panel 18 is that when the impact load F1 is applied, the center pipe 24 and the rear end panel 18 both can be satisfactorily moved towards the front of the vehicle body. The left- and right-side pipes 25, 26 thereby both stably undergo bending deformation towards the front of the vehicle body, and the remaining impact load F3 can be stably absorbed.

Providing the center pipe 24 to the rear end panel 18 also allows part of the impact load F1 to be dispersed to the rear end panel 18.

As previously described, the left end pipe 22 is mounted on the left connecting part 45 by the left mounting bracket 41 made of a high-tensile steel plate, and the right end pipe 23 is mounted on the right connecting part 46 by the right mounting bracket 42 made of a high-tensile steel plate.

Consequently, if a remaining impact load F3 acts on the left- and right-side pipes 25, 26, the left and right end pipes 22, 23 are prevented from undergoing bending deformation by the left and right mounting brackets 41, 42, the left- and right-side pipes 25, 26 stably undergo bending deformation towards the front of the vehicle body, and the remaining impact load F3 can be stably absorbed.

Thus, the left- and right-side pipes 25, 26 undergo compressive deformation in their respective axial directions as well as bending deformation towards the front of the vehicle body, whereby the impact load F1 is satisfactorily absorbed. Satisfactorily absorbing the impact load F1 reliably protects the large battery 38 placed in the battery storage space 37.

In the embodiment described above, an example was described in which the left mounting bracket 41 was fixed by welding to the left end pipe 22 and the right mounting bracket 42 was fixed by welding to the right end pipe 23, but the present invention is not limited to this option alone, and the mounting brackets may also be fixed by bolts or other such fastening members.

Next, a rear frame structure 100 of the second embodiment will be described with reference to FIGS. 7 through 11C.

Figure 7:
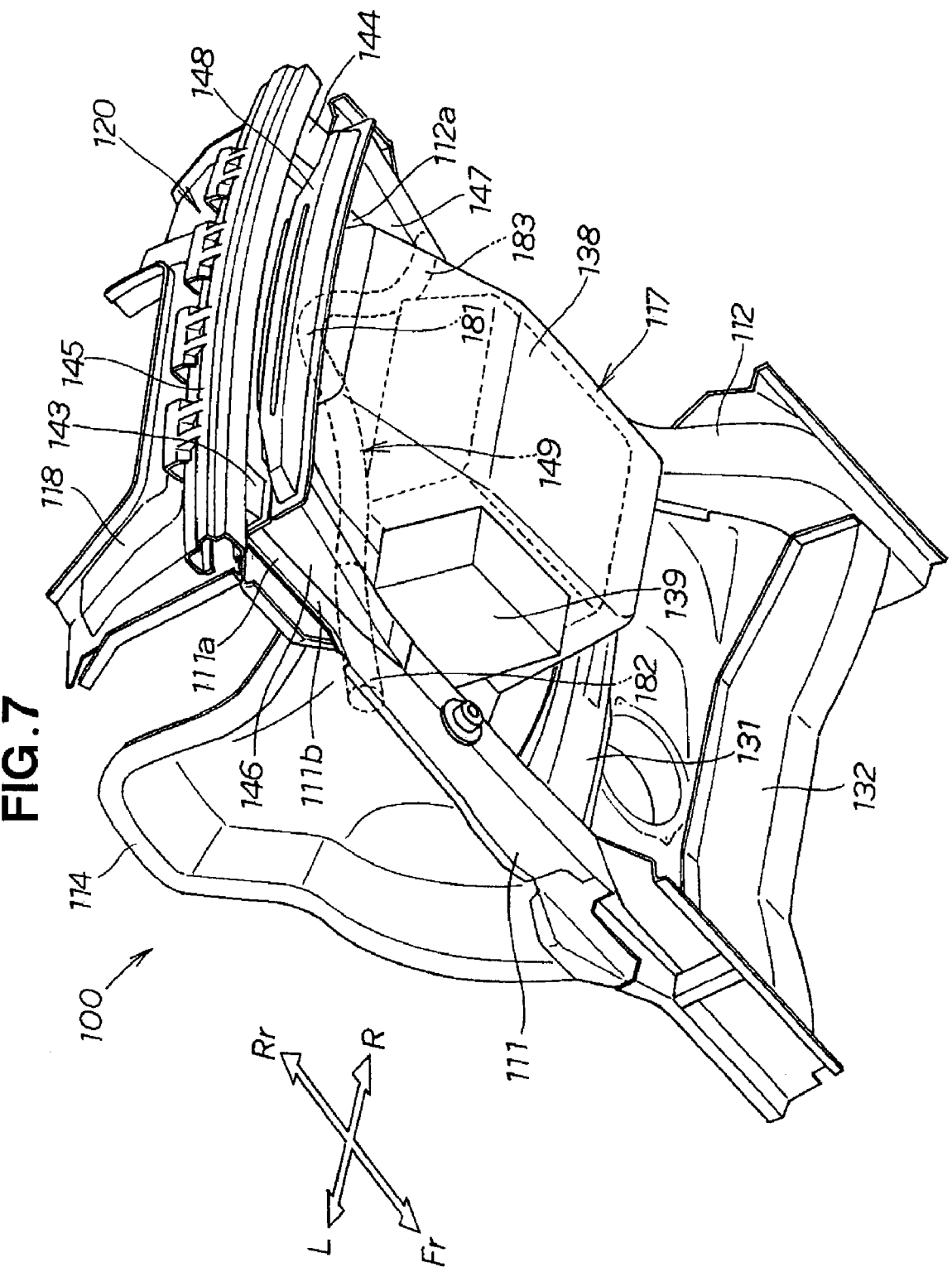
FIG. 7 is a perspective view of a rear frame structure according to a second embodiment of the present invention, as seen from behind.

Referring to FIG. 7, the rear frame structure 100 of the second embodiment includes left and right rear frames 111, 112 disposed along the longitudinal direction of the vehicle body, left and right rear wheel houses 114 (the right rear wheel house is not shown) provided to the left and right rear frames 111, 112, a rear floor panel 117 provided between the left and right rear frames 111, 112, a rear end panel 118 provided at the rear ends of the left and right rear frames 111, 112 and the rear end of the rear floor panel 117, and impact-absorbing means 120 provided between the left and right rear frames 111, 112.

The rear frame structure 100 further includes cross members 131, 132 disposed at specific intervals in front of the rear floor panel 117. The cross members 131, 132 span the distance between the left and right rear frames 111, 112.

The left rear wheel house 114 is provided to the left rear frame 111 and is used to house a left rear wheel and a left rear damper (not shown).

The right rear wheel house, which is not shown, is bilaterally symmetrical to the left rear wheel house 114. This right rear wheel house is provided to the right rear frame 112 and is used to house a right rear wheel and a right rear damper (not shown).

Figure 8:
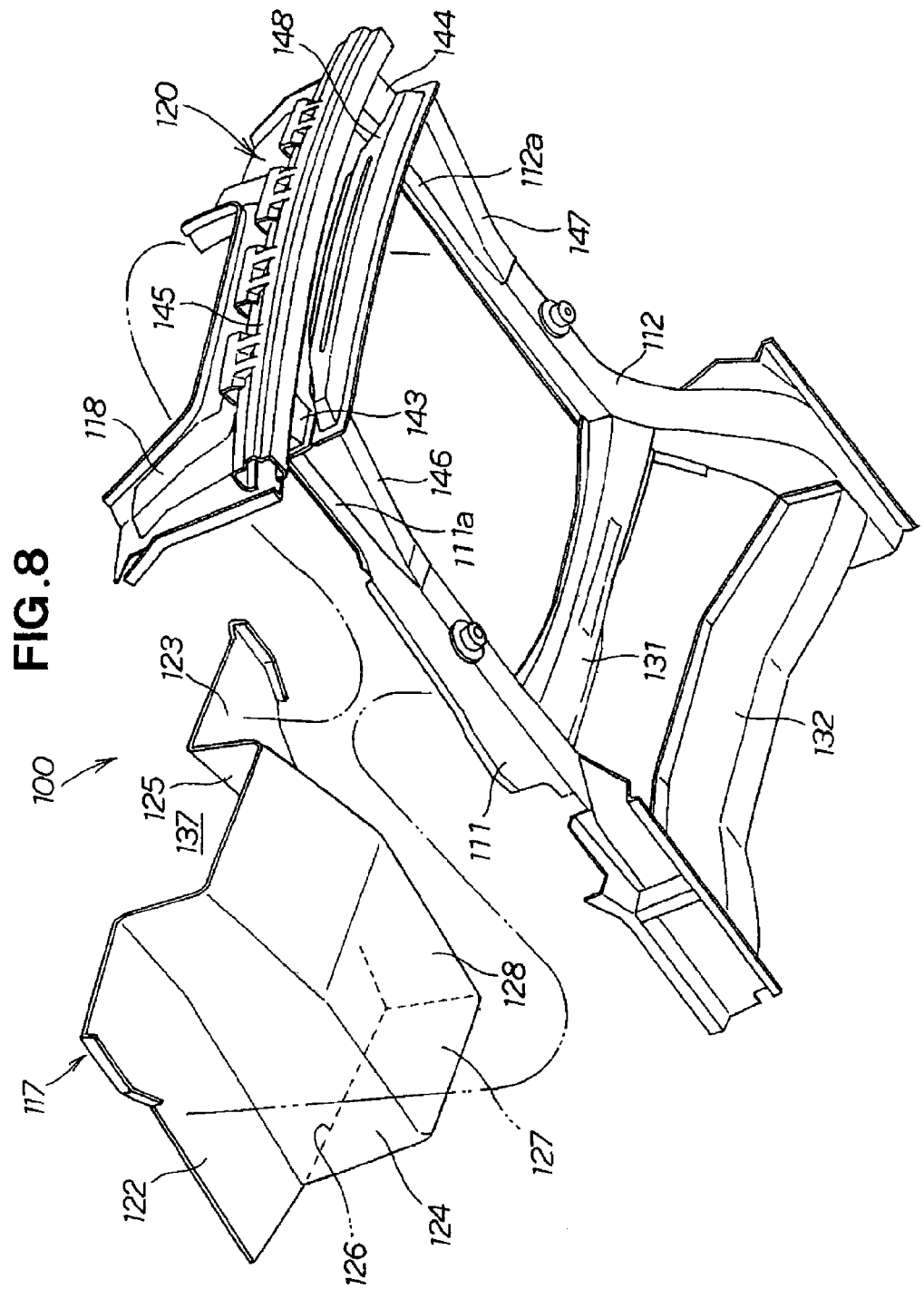
FIG. 8 is a perspective view showing the rear floor panel as being removed from the rear frame structure of FIG. 7.

FIG. 8 shows a state in which the rear floor panel 117 is removed from the rear frame structure 100 shown in FIG. 7.

Referring to FIG. 8, a left mounting part 122 of the rear floor panel 117 is mounted on the top of the left rear frame 111, and a right mounting part 123 is mounted on the top of the right rear frame 112.

The rear floor panel 117 has a left wall 124 that extends down from the inside of the left mounting part 122, a right wall 125 that extends down from the inside of the right mounting part 123, a front wall 127 that extends down from a front end part 126, and a bottom part 128 provided at the bottom of the left wall 124, the bottom of the right wall 125, and the bottom of the front wall 127.

The rear floor panel 117 has a storage space 137 formed by the left and right walls 124, 125, the front wall 127, and the bottom part 128. The storage space 137 stores a battery 138 (FIG. 7), other electrical components (not shown), and the like.

The battery 138 is a large battery for supplying voltage to motor (not shown) for a hybrid automobile.

A canister 139 (FIG. 7 for retaining gases evaporated from the fuel is provided along the side of the left wall 124.

The rear end panel 118 has a left bottom part 118a (FIG. 9) that is attached to the rear end 111a of the left rear frame 111, and a right bottom part 118b (FIG. 9) that is attached to the rear end 112a of the right rear frame 112.

Returning to FIG. 7, the impact-absorbing means 120 includes a left extension 143 provided to the rear end 111a of the left rear frame 111, a right extension 144 provided to the rear end 112a of the right rear frame 112, a bumper beam 145 spanning the distance between the left and right extensions 143, 144, a left gusset 146 provided to a rear end bottom part 111b of the left rear frame 111, a right gusset 147 provided to a rear end bottom part 112b (FIG. 9) of the right rear frame 112, a cross member 148 spanning the distance between the left and right gussets 146, 147, and a reinforcing member 149 provided in front of the cross member 148. The reinforcing member 149 is equivalent to the impact-absorbing member 21 of the first embodiment shown in FIG. 1.

Figure 9:
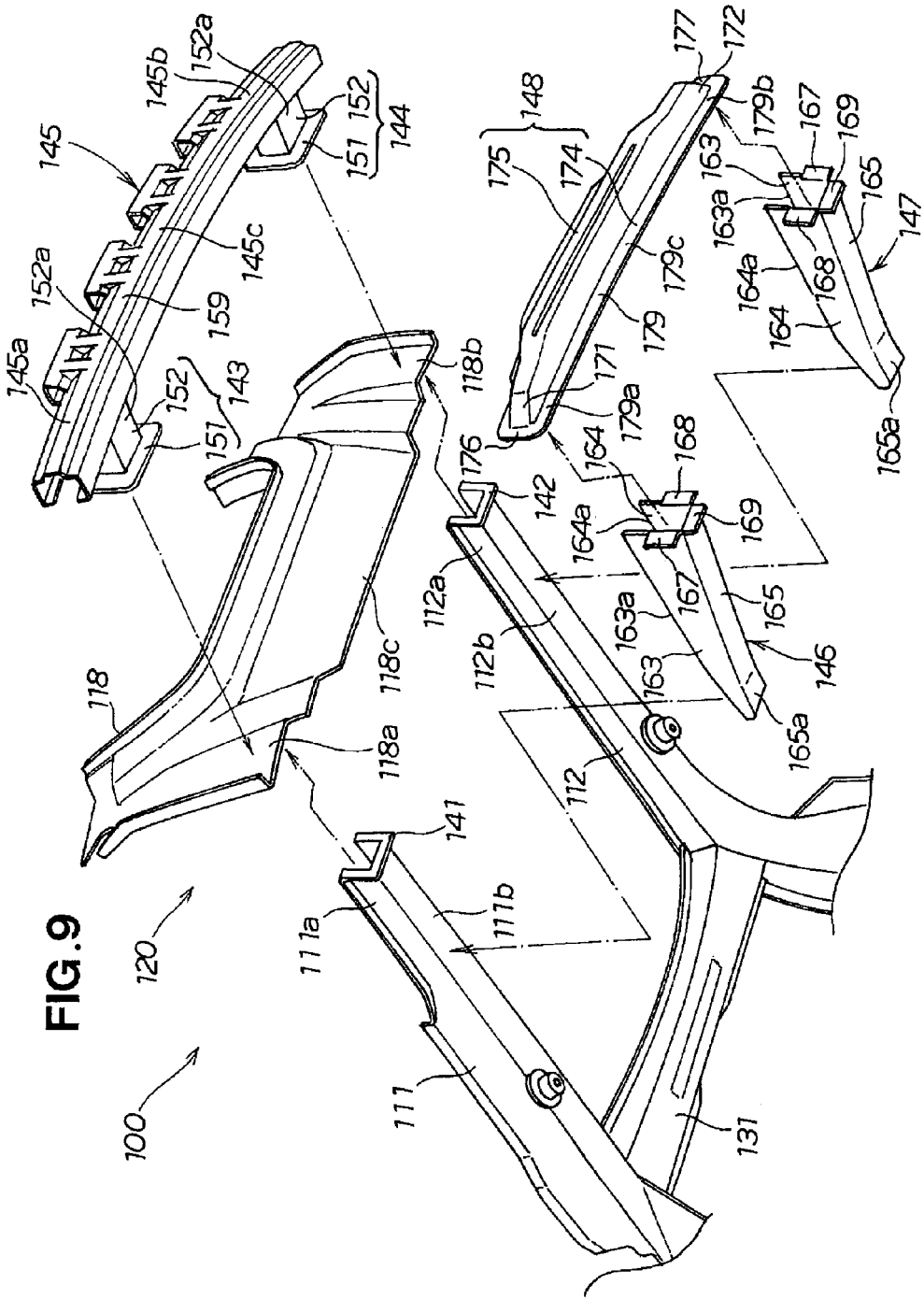
FIG. 9 is a perspective view showing an exploded view of the impact-absorbing means of FIG. 8.

Referring to FIG. 9, the left bottom part 118a of the rear end panel 118 is mounted on a left flange 141 formed at the rear end 111a of the left rear frame 111. Similarly, the right bottom part 118b of the rear end panel 118 is mounted on a right flange 142 formed at the rear end 112a of the right rear frame 112.

The left extension 143 has a base 151 formed into a substantially rectangular shape, and an extension main body 152 protruding from the base 151 towards the rear of the vehicle body.

The base 151, together with the left bottom part 118a of the rear end panel 118, is mounted on the rear end 111a of the left rear frame 111 (specifically, on the left flange 141).

A left end 145a of the bumper beam 145 is attached to a rear end 152a of the extension main body 152 formed into a substantially rectangular frame in cross section.

The right extension 144 has the same configuration as the left extension 143. The structural components of the right extension 144 are denoted by the same numerical symbols as the left extension 143, and descriptions thereof are omitted.

The base 151 of the right extension 144, together with the right bottom part 118b of the rear end panel 118, is mounted on the rear end 112a of the right rear frame 112 (specifically, on the right flange 142).

A right end 145b of the bumper beam 145 is attached to the rear end 152a of the extension main body 152 of the right extension 144.

Figure 10:
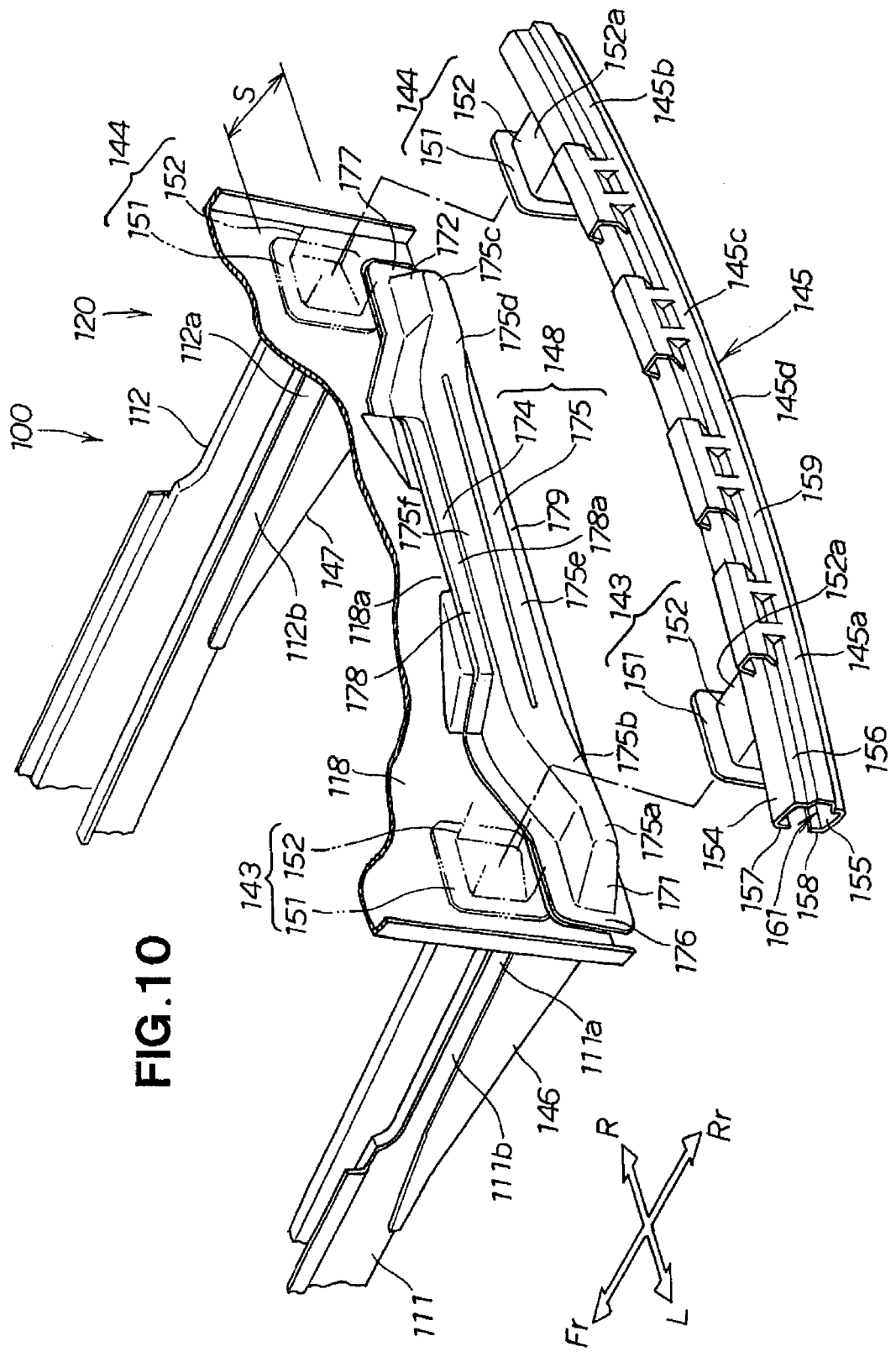
FIG. 10 is a perspective view showing the left and right extensions and the bumper beam as being removed from the rear frame structure according to the second embodiment.

The bumper beam 145 extends in the width direction of the vehicle body and is formed into a curved shape in which a center part 145c protrudes towards the rear of the vehicle body. The bumper beam 145 is formed into a substantial U shape in cross section by a top wall 154, a bottom wall 155, and a rear wall 156, as shown in FIG. 10. The top wall 154 has a top flange 157 bent downward on a forward edge. The bottom wall 155 has a bottom flange 158 bent upward on a forward edge. The rear wall 156 has a bead 159 protruding in a substantially curved cross section towards the rear of the vehicle body. The rigidity of the bumper beam 145 can be increased by forming the bead 159 in the rear wall 156.

The rear end 152a of the left extension main body 152 is inserted into an inside space 161 formed into a substantial U shape in cross section in the bumper beam 145, and the rear end 152a is attached to the left end 145a of the bumper beam 145. The rear end 152a of the right extension main body 152 is similarly attached to the right end 145b of the bumper beam 145.

Specifically, the left extension 143 is located between the left end 145a of the bumper beam 145 and the left rear frame 111. Similarly, the right extension 144 is located between the right end 145b of the bumper beam 145 and the right rear frame 112. The bumper beam 145 is thereby provided at a specific interval S (FIG. 10) away from the rear end 111a of the left rear frame 111 and the rear end 112a of the right rear frame 112 towards the rear of the vehicle body.

The left gusset 146 is formed into a substantial U shape in cross section by an outer side wall 163, an inner side wall 164, and a slanted bottom wall 165, as shown in FIG. 9.

The top 163a of the outer side wall 163 is formed substantially horizontal, and the bottom is formed at a downward gradient towards the rear of the vehicle body. The outer side wall 163 has, on a rear edge thereof, an outward bent part 167 that is bent to the left with respect to the width of the vehicle body.

The top 164a of the inner side wall 164, similar to the outer side wall 163, is formed substantially horizontal, and the bottom is formed at a downward gradient towards the rear of the vehicle body. The inner side wall 164 has, on a rear edge thereof, an inward bent part 168 that is bent to the right with respect to the width of the vehicle body.

The slanted bottom wall 165 is provided between the bottom of the outer side wall 163 and the bottom of the inner side wall 164, and is thereby formed at a downward gradient towards the rear of the vehicle body. The slanted bottom wall 165 has, on a rear edge thereof, a bottom bent part 169 that extends downward.

With the left gusset 146 in a state of being fitted in the rear end bottom part 111b of the left rear frame 111, the top 163a of the outer side wall 163 is joined to the outer side wall of the left rear frame 111, and the top 164a of the inner side wall 164 is joined to the inner side wall of the left rear frame 111. The front end 165a of the slanted bottom wall 165 is joined to the bottom wall of the left rear frame 111. The left gusset 146 is thereby mounted on the rear end bottom part 111b of the left rear frame 111.

The left gusset 146 is positioned in front of and below the bumper beam 145.

The outward bent part 167, the inward bent part 168, and the bottom bent part 169 are disposed so as to be coplanar with the left flange 141 of the left rear frame 111, and are also positioned below the left flange 141.

The right gusset 147 has substantially the same shape as the left gusset 146, and therefore the same numerical symbols as the left gusset 146 are used for the right gusset 147, and descriptions thereof are omitted.

With the right gusset 147 in a state of being fitted in the rear end bottom part 112b of the right rear frame 112, the top 163a of the outer side wall 163 is joined to the outer side wall of the right rear frame 112, and the top 164a of the inner side wall 164 is joined to the inner side wall of the right rear frame 112. The front end 165a of the slanted bottom wall 165 is joined to the bottom wall of the right rear frame 112. The right gusset 147 is thereby mounted on the rear end bottom part 112b of the right rear frame 112.

The right gusset 147 is disposed in front of and below the bumper beam 145, similar to the left gusset 146.

The outward bent part 167, the inward bent part 168, and the bottom bent part 169 are disposed so as to be coplanar with the right flange 142 of the right rear frame 112, and are also positioned below the right flange 142.

The cross member 148 is joined to the left gusset 146 at the left end 171 and to the right gusset 147 at the right end 172, and thereby spans the distance between the left and right gussets 146, 147. The cross member 148 is disposed below the bumper beam 145 and also in front of the bumper beam 145.

The cross member 148 has a base 174 joined to the left and right gussets 146, 147 and to the rear end panel 118, and a protuberance 175 that protrudes from the base 174 towards the rear of the vehicle body.

The base 174 has a left projection 176 that projects to the left from the left edge of the protuberance 175, a right projection 177 that projects to the right from the right edge of the protuberance 175, a top projection 178 (FIG. 10) that projects upward from the protuberance 175, and a bottom projection 179 that projects downward from the protuberance 175.

The left projection 176 is joined to the outward bent part 167 of the left gusset 146, and the right projection 177 is joined to the outward bent part 167 of the right gusset 147.

A left end 179a of the bottom projection 179 is joined to the bottom bent part 169 of the left gusset 146, and a right end 179b is joined to the bottom bent part 169 of the right gusset 147. A center part 179c of the bottom projection 179 is joined to a bottom center part 118c of the rear end panel 118.

A center part 178a of the top projection 178 is bent so as to protrude towards the rear of the vehicle body as shown in FIG. 10, and in this bent state, the center part is joined along the rear end panel 118.

The protuberance 175 is formed into a substantial U shape in cross section. A left slanted part 175b of the protuberance 175 extends at an upward gradient from a left end 175a towards the center with respect to the width of the vehicle body. A right slanted part 175d extends at an upward gradient from a right end 175c towards the center with respect to the width of the vehicle body. A center part 175e of the protuberance 175 extends horizontally between the left and right slanted parts 175b, 175d.

The left and right ends 175a, 175c are disposed below the center part 175e. Consequently, the left end 175a of the protuberance 175 is in a position that does not interfere with the left extension 143. The right end 175c of the protuberance 175 is similarly in a position that does not interfere with the right extension 144.

The cross member 148 is disposed in front of the bumper beam 145. Within the center part 175e of the cross member 148, a top area 175f is positioned above a bottom part 145d of the bumper beam 145. Therefore, when viewed from behind, the top area 175f of the center part 175e can overlap the bottom part 145d of the bumper beam 145.

Consequently, the bumper beam 145 and the cross member 148 can be disposed at a position (height) at which an impact load acts from behind the vehicle. Impact loads from behind the vehicle can thereby be satisfactorily received by the bumper beam 145 and the cross member 148.

The position (height) where impact loads from behind the vehicle act is determined by established factors.

Disposing the cross member 148 in front of the bumper beam 145 causes minor loads to be supported by the bumper beam 145, and major loads to be supported by both the bumper beam 145 and the cross member 148. The rear frame structure 100 is thereby applicable within a wide range of minor to major loads.

When the cross member 148 is disposed below the bumper beam 145, it is possible to increase the vertical dimension of the pressure-receiving surface (the surface that bears the load) in relation to rear collisions. Thereby, the load from a collision can be sufficiently absorbed by the cross member 148, the bumper beam 145, and other components, even in cases in which the automobile is struck from behind by a vehicle of a different height.

Returning to FIG. 7, the reinforcing member 149 is composed of a frame obtained by welding and connecting pipe or a press plate spanning the distance between the left and right rear frames 111, 112 in front of the cross member 148.

A center part 181 of the reinforcing member 149 is formed into a curved shape so as to protrude toward the cross member 148.

A left end 182 of the reinforcing member 149 is mounted at the juncture between the left rear frame 111 and the left rear wheel house 114 using a left mounting bracket (refer to reference numeral 41 in FIG. 1).

A right end 183 of the reinforcing member 149 is mounted at the juncture between the right rear frame 112 and the right wheel house using a right mounting bracket (refer to reference numeral 42 in FIG. 1).

Figure 11A:
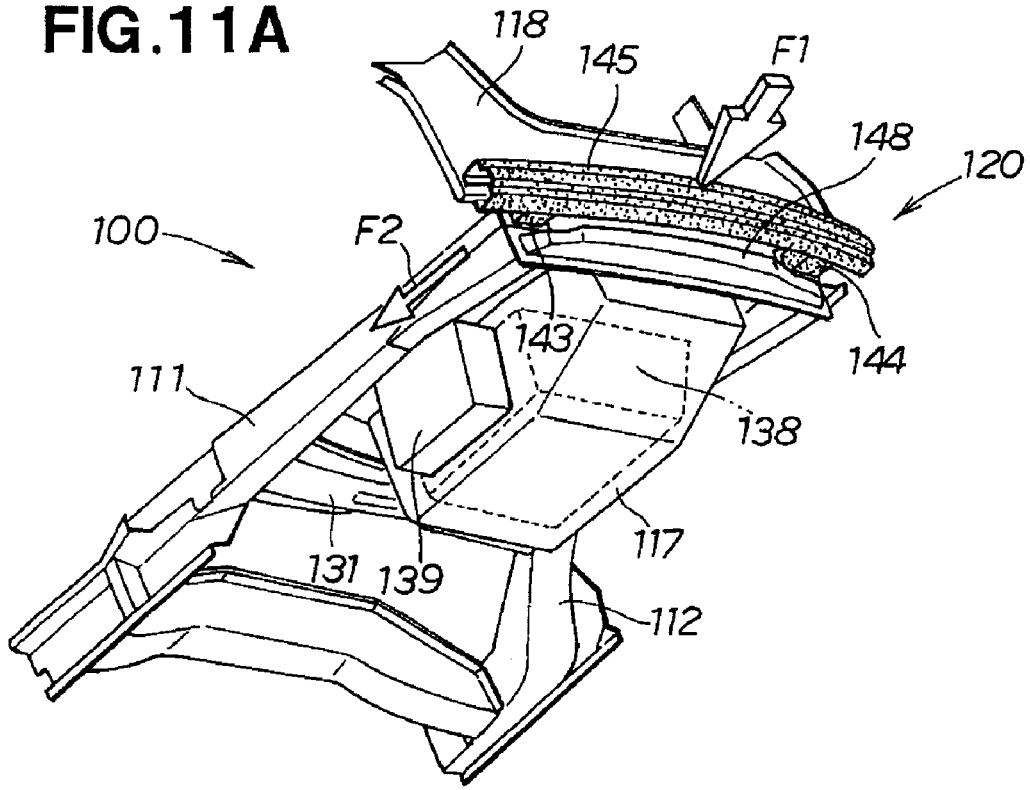
FIGS. 11A through 11C are perspective views showing an example in which a load acts on the rear surface of the rear frame structure according to the second embodiment.
Figure 11B:
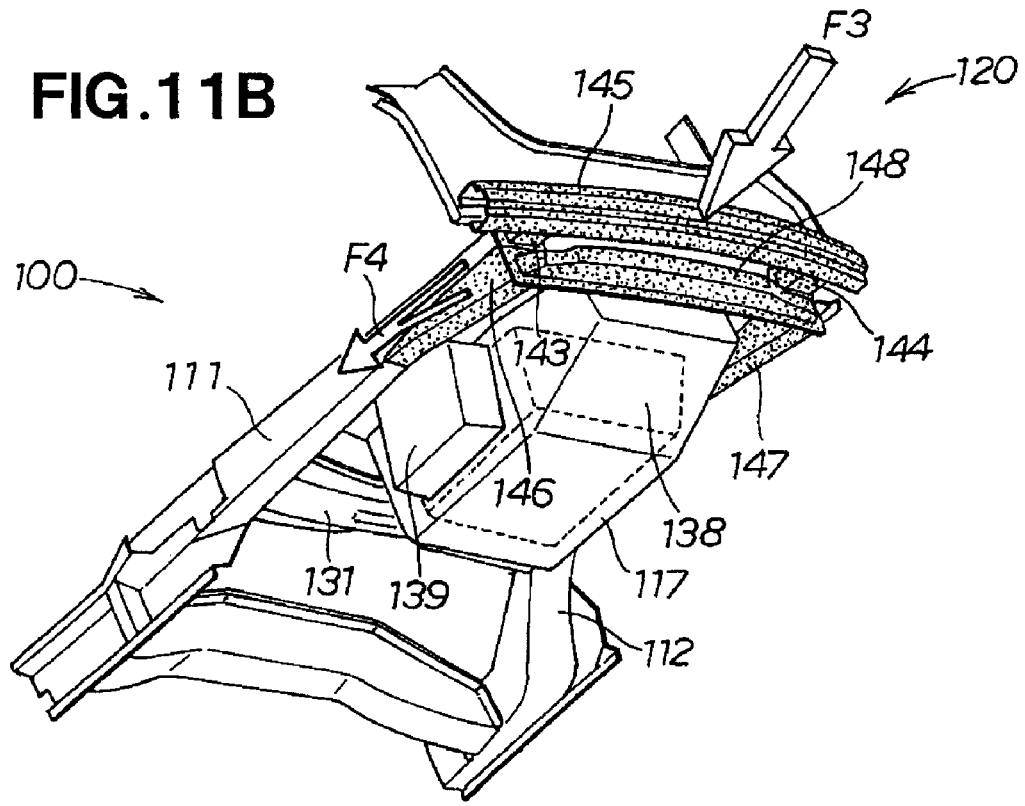
Figure 11C:
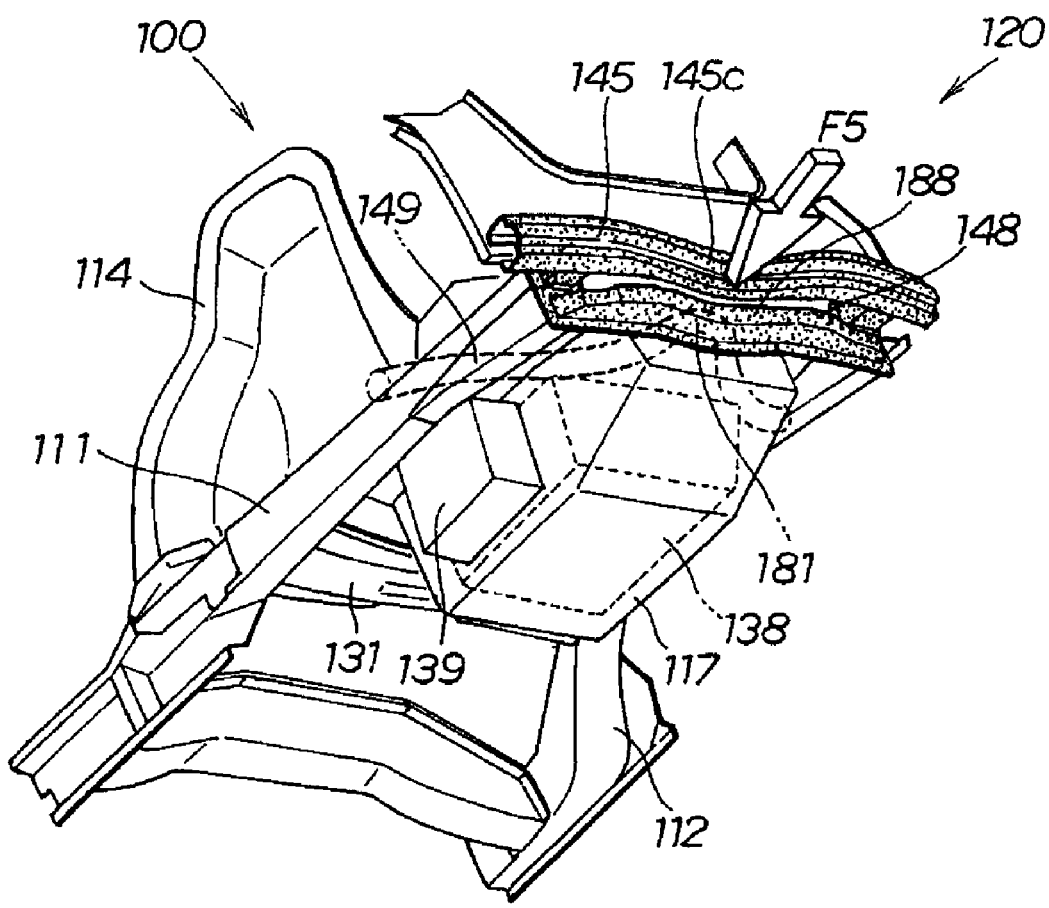

The reasons for providing the reinforcing member 149 are illustrated in detail in FIG. 11C.

Next, an example of a load acting on the rear surface of the rear frame structure 100 will be described with reference to FIGS. 11A through 11C.

FIG. 11A shows an example of a minor load being applied to the rear surface of the rear frame structure, FIG. 11B shows an example of a major load being applied, and FIG. 11C shows an example of a local load being applied to the center of the rear surface of the rear frame structure.

In FIG. 11A, when the rear surface of the vehicle body, e.g., the rear surface of the rear frame structure 100, undergoes a minor collision, a minor load F1 is applied to the bumper beam 145.

The applied minor load F1 is transferred to the left and right extensions 143, 144 via the bumper beam 145. The bumper beam 145 deforms and the left and right extensions 143, 144 buckle, thereby absorbing part of the minor load F1.

The remaining load is transferred to the left and right rear frames 111, 112 as shown by the arrow F2 (an arrow F2 is not shown for the right rear frame 112). The remnant of the transferred load is supported by the left and right rear frames 111, 112.

When a minor load acts on the rear surface of the rear frame structure 100, the battery 138, other electrical components, the canister 139, and the like placed in the rear part of the vehicle body are reliably protected by the bumper beam 145 and the left and right extensions 143, 144.

In FIG. 11B, when a major collision acts on the rear surface of the rear frame structure 100, a major load F3 from the rear collision acts first on the bumper beam 145. The applied major load F3 deforms the bumper beam 145 and causes the left and right extensions 143, 144 to buckle.

As a result of the deformation of the bumper beam 145 and the collapse of the left and right extensions 143, 144, the bumper beam 145 is displaced forward up to the cross member 148. Consequently, the major load F3 is applied to the bumper beam 145 and the cross member 148. The load F3 applied to the cross member 148 causes the cross member 148 to deform, and also causes the left and right gussets 146, 147 to deform.

Consequently, part of the major load F3 is absorbed as a result of the deformation of the bumper beam 145, the collapse of the left and right extensions 143, 144, the deformation of the cross member 148, and the deformation of the left and right gussets 146, 147.

The remnant of the load is transferred to the left and right rear frames 111, 112 via the bumper beam 145 and the left and right extensions 143, 144, as shown by the arrow F4 (an arrow F4 is not shown for the right rear frame 112), and is also transferred to the left and right rear frames 111, 112 via the cross member 148 and the left and right gussets 146, 147, as shown by the arrow F4 (an arrow F4 is not shown for the right rear frame 112). The remnant of the transferred load F4 is supported by the left and right rear frames 111, 112.

In cases in which a major load F3 is applied to the rear surface of the rear frame structure 100, the battery 138, other electrical components, the canister 139, and the like placed in the rear part of the vehicle body are reliably protected by the bumper beam 145, the left and right extensions 143, 144, the cross member 148, and the left and right gussets 146, 147.

Referring to FIG. 11C, when a load F5 is locally applied to the center of the rear surface of the rear frame structure 100, the load F5 first acts on the center part 145c of the bumper beam 145. The center part 145c of the bumper beam 145 is locally deformed by the load F5. When the center part 145c of the bumper beam 145 deforms, the center part 145c of the bumper beam 145 deforms forward up to the cross member 148. Consequently, the load F5 acts on the center part 145c of the bumper beam 145 and a center part 188 of the cross member 148.

The center part 188 of the cross member 148 is composed of the center part 175e of the protuberance 175, the center part 178a of the top projection 178, and the center part of the bottom projection 179, as shown in FIG. 10.

The center part 188 of the cross member 148 is deformed locally by the load F5. Part of the load F5 is absorbed as a result of the local deformation of the center part 145c of the bumper beam 145 and the center part 188 of the cross member 148.

As a result of the local deformation of the center part 188 of the cross member 148, the center part 188 comes into contact with the center part 181 of the reinforcing member 149, and the remnant of the load F5 is supported by the reinforcing member 149.

The battery 138, other electrical components, the canister 139, and the like placed in the rear part of the vehicle body are thereby reliably protected by the reinforcing member 149 even when a load F5 acts locally on the center of the rear surface of the rear frame structure 100.

The shapes and other features of the rear floor panel 117, the rear end panel 118, the left and right extensions 143, 144, the bumper beam 145, the left and right gussets 146, 147, the cross member 148, and the reinforcing member 149 are not limited to the examples described, and suitable modifications to their designs can be made.

The rear frame structure of the present invention is suitable for application in automobiles that carry batteries for hybrid vehicles between left and right rear frames.

Obviously, various minor changes and modifications of the present invention are possible in light of the above teaching. It is therefore to be understood that within the scope of the appended claims the invention may be practiced otherwise than as specifically described.

What is claimed is:

1. A rear frame structure for a vehicle, comprising:
   left and right rear frames disposed in transversely spaced relation to each other;
   left and right rear wheel houses disposed on the left and right rear frames and designed to house left and right rear wheels;
   a rear end panel disposed behind the left and right rear frames; and
   an impact-absorbing member disposed between the left and right rear frames and in front of the rear end panel,
   wherein the impact-absorbing member comprises a high-ductility metal reinforcing member which includes:
   a left end disposed at a left connecting part of the left rear frame and the left rear wheel house;
   a right end disposed at a right connecting part of the right rear frame and the right rear wheel house;
   a center part bent to protrude rearwardly of the vehicle and positioned lower than the left and right ends so as to be located at a position where an impact load is applied;
   a left-side part extending from the center part linearly upwardly to the left end; and
   a right-side part extending from the center part linearly upwardly to the right end,
   the impact-absorbing member being formed into a substantially V shape as viewed in top plan by the left- and right-side parts, the left and right ends, and the center part.

2. The rear frame structure of claim 1, wherein the center part is attached to the rear end panel.

3. The rear frame structure of claim 1, wherein the left and right ends are mounted respectively on the left and right connecting parts via left and right mounting brackets formed of high-tensile steel plates.

* * * * *